United States Patent
Okada et al.

(10) Patent No.: US 10,526,432 B2
(45) Date of Patent: Jan. 7, 2020

(54) METHOD FOR PRODUCING COPOLYMER

(71) Applicant: Nippon Shokubai Co., Ltd., Osaka (JP)

(72) Inventors: Atsushi Okada, Osaka (JP); Nobuhiro Kobayashi, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 16/096,066

(22) PCT Filed: Apr. 27, 2017

(86) PCT No.: PCT/JP2017/016824
§ 371 (c)(1),
(2) Date: Oct. 24, 2018

(87) PCT Pub. No.: WO2017/188400
PCT Pub. Date: Nov. 2, 2017

(65) Prior Publication Data
US 2019/0127504 A1 May 2, 2019

(30) Foreign Application Priority Data
Apr. 28, 2016 (JP) .................. 2016-090750

(51) Int. Cl.
C08F 2/00 (2006.01)
C08G 61/04 (2006.01)
C08F 216/14 (2006.01)
C08F 2/01 (2006.01)
C08F 290/06 (2006.01)
B01D 39/16 (2006.01)
C02F 1/00 (2006.01)
C02F 1/42 (2006.01)

(52) U.S. Cl.
CPC .... C08F 216/1416 (2013.01); B01D 39/1607 (2013.01); C02F 1/001 (2013.01); C02F 1/42 (2013.01); C08F 2/01 (2013.01); C08F 290/06 (2013.01); *C08F 2216/1433* (2013.01); *C08F 2800/20* (2013.01)

(58) Field of Classification Search
CPC ........ C08F 216/1416; C08F 2216/1413; C08F 2800/20; C08F 2216/1433; C08F 290/06; B01D 39/1607; C02F 1/001; C02F 1/42

USPC .......................................... 526/83, 72; 520/1
See application file for complete search history.

(56) References Cited

U.S. PATENT DOCUMENTS

| | | | |
|---|---|---|---|
| 2003/0087983 A1 | 5/2003 | Kajikawa | |
| 2009/0131560 A1 | 5/2009 | Ono | |
| 2011/0245133 A1 | 10/2011 | Dupont | |
| 2011/0251115 A1 | 10/2011 | Dupont | |
| 2012/0189861 A1* | 7/2012 | Matsumoto | C08F 20/06 428/501 |

FOREIGN PATENT DOCUMENTS

| | | |
|---|---|---|
| CN | 105294952 A | 2/2016 |
| CN | 205412998 U | 8/2016 |
| JP | 2003-137922 A | 5/2003 |
| JP | 2003-268015 A | 9/2003 |
| JP | 2005-350516 A | 12/2005 |
| JP | 2006-097007 A | 4/2006 |
| JP | 2007-091580 A | 4/2007 |
| JP | 2007-197519 A | 8/2007 |
| JP | 2010-077428 A | 4/2010 |
| JP | 2011-032132 A | 2/2011 |
| JP | 2011-098267 A | 5/2011 |
| WO | 2010/024448 A1 | 3/2010 |
| WO | 2011/040575 A1 | 4/2011 |

OTHER PUBLICATIONS

Extended European Search Report for 17 78 9681 dated Feb. 13, 2019.
International Search Report for International Application No. PCT/JP2017/016824 dated Jul. 18, 2017.

* cited by examiner

*Primary Examiner* — Jessica Whiteley
(74) *Attorney, Agent, or Firm* — Pearne & Gordon LLP

(57) ABSTRACT

A method of producing a copolymer of the present invention is a method of producing a specific copolymer and includes: a pure water production step of producing pure water having an electric conductivity of from 0.1 µS/cm to 100 µS/cm; a pure water transfer step of introducing the pure water into a reaction kettle for producing the copolymer through a transfer pipe using, as a material therefor, a resin or a substance forming a passive state in water; and a polymerization step of performing polymerization of the monomer (a), the monomer (b), and the monomer (c) in the reaction kettle, the pure water transfer step including setting the electric conductivity of the pure water at a site where the pure water is introduced from the transfer pipe toward the reaction kettle within a range of from 0.1 µS/cm to 100 µS/cm.

8 Claims, No Drawings

METHOD FOR PRODUCING COPOLYMER

TECHNICAL FIELD

The present invention relates to a method of producing a copolymer.

BACKGROUND ART

When water for polymerization use is used in each of production plants for various polymers and copolymers, the water for polymerization use is generally introduced into a polymerization kettle through a transfer pipe.

Industrial water, pure water (water in which the amount of impurities has been reduced by performing a treatment, such as a deionization treatment, a distillation treatment, or a reverse osmosis membrane treatment), or the like is generally used as the water for polymerization use. In particular, in a production plant requiring water for polymerization use containing a small amount of impurities, first, the water for polymerization use containing a small amount of impurities is prepared by a pure water production step (see, for example, Patent Literature 1).

However, even when similar kinds of pure water are used, depending on the kind of polymer or copolymer to be produced, polymerization reproducibility may be high, or the polymerization reproducibility may be low, and hence stable production of a high-quality product (copolymer) may be hindered.

CITATION LIST

Patent Literature

[PTL 1] JP 2011-98267 A

SUMMARY OF INVENTION

Technical Problem

In particular, the inventors of the present invention have had the following experience at the time of plant operation in an actual production plant: in the production of a specific copolymer containing a structural unit derived from an unsaturated polyalkylene glycol ether-based monomer and a structural unit derived from an unsaturated monocarboxylic acid-based monomer as essential components, as described above, even when similar kinds of pure water are used, depending on the kind of polymer or copolymer to be produced, polymerization reproducibility may be high, or the polymerization reproducibility may be low, and hence stable production of the copolymer is liable to be hindered. For example, it has been found that at the time of the use of such copolymer in a cement dispersant application, the polymerization reproducibility adversely affects cement-dispersing performance. The inventors have made an investigation on means for solving such problem.

That is, an object of the present invention is to provide a method in which when, in the production of a specific copolymer containing a structural unit derived from an unsaturated polyalkylene glycol ether-based monomer and a structural unit derived from an unsaturated monocarboxylic acid-based monomer as essential components, water for polymerization use containing a small amount of impurities is prepared by a pure water production step and a pipe made of a specific material is used as a pipe for a pure water transfer step, the copolymer can be stably produced.

Solution to Problem

According to one aspect of the present invention, there is provided a method of producing a copolymer containing 50 wt % to 99 wt % of a structural unit (I) derived from an unsaturated polyalkylene glycol ether-based monomer (a) represented by the general formula (1), 1 wt % to 50 wt % of a structural unit (II) derived from an unsaturated monocarboxylic acid-based monomer (b) represented by the general formula (2), and 0 wt % to 49 wt % of a structural unit (III) derived from a monomer (c) copolymerizable with the monomer (a) and/or the monomer (b), provided that a total of the structural unit (I), the structural unit (II), and the structural unit (III) is 100 wt %, the method including:

a pure water production step of producing pure water having an electric conductivity of from 0.1 μS/cm to 100 μS/cm;

a pure water transfer step of introducing the pure water into a reaction kettle for producing the copolymer through a transfer pipe using, as a material therefor, a resin or a substance forming a passive state in water; and a polymerization step of performing polymerization of the monomer (a), the monomer (b), and the monomer (c) in the reaction kettle, the pure water transfer step including setting the electric conductivity of the pure water at a site where the pure water is introduced from the transfer pipe toward the reaction kettle within a range of from 0.1 μS/cm to 100 μS/cm.

$$Y^1O(R^1O)_nR^2 \quad (1)$$

In the general formula (1), $Y^1$ represents $CH_2=CR^0-(CH_2)_m-$, $R^0$ represents a hydrogen atom or an alkyl group having 1 to 3 carbon atoms, m represents an integer of from 0 to 2, $R^1O$ represents one or two or more kinds of oxyalkylene groups each having 2 to 18 carbon atoms, n represents an average number of moles added of oxyalkylene groups, and is more than 0 and 500 or less, and $R^2$ represents a hydrogen atom or a hydrocarbon group having 1 to 30 carbon atoms.

(2)

In the general formula (2), $R^3$, $R^4$, and $R^5$ may be identical to or different from one another, and each represent a hydrogen atom or a methyl group, and M represents a hydrogen atom, a metal atom, an ammonium group, or an organic ammonium group.

In one embodiment, the material for the transfer pipe includes at least one kind selected from a resin containing at least one kind selected from the group consisting of polyethylene, polypropylene, polystyrene, polyvinyl chloride, polyester, and Teflon (trademark), and an alloy containing at least one kind selected from the group consisting of chromium, aluminum, and titanium.

In one embodiment, in the pure water transfer step, a length L (m) of the transfer pipe, a flow velocity V (m/sec) of the pure water, and an inner radius R (m) of the transfer pipe have a relationship of $1.0\times10^2 \text{ sec/m}^2 \leq (L/V)/(2\pi \times R) \leq 3.0\times10^5 \text{ sec/m}^2$.

In one embodiment, $R^0$ forming $Y^1$ in the general formula (1) represents a hydrogen atom or a methyl group.

In one embodiment, the unsaturated monocarboxylic acid-based monomer (b) includes (meth)acrylic acid-based monomer.

In one embodiment, a ratio between the unsaturated polyalkylene glycol ether-based monomer (a) and the unsaturated monocarboxylic acid-based monomer (b) satisfies a relationship of {the monomer (b)/(the monomer (a)+ the monomer (b))}×100≥5.8 in terms of a weight ratio.

In one embodiment, the copolymer has a weight-average molecular weight of from 10,000 to 300,000 in terms of polyethylene glycol by gel permeation chromatography.

In one embodiment, when production of the copolymer is performed under the same conditions at least three times, weight-average molecular weights of the copolymers to be obtained each fall within a range of from 10,000 to 300,000 in terms of polyethylene glycol by gel permeation chromatography, and a coefficient of variation CV of the weight-average molecular weights of the copolymers to be obtained is 0.04 or less.

According to another aspect of the present invention, there is provided a copolymer. The copolymer has a weight-average molecular weight of from 10,000 to 300,000 in terms of polyethylene glycol by gel permeation chromatography, and a coefficient of variation CV of the weight-average molecular weight of 0.04 or less, and includes:

50 wt % to 99 wt % of a structural unit (I) derived from an unsaturated polyalkylene glycol ether-based monomer (a) represented by the general formula (1);

1 wt % to 50 wt % of a structural unit (II) derived from an unsaturated monocarboxylic acid-based monomer (b) represented by the general formula (2); and 0 wt % to 49 wt % of a structural unit (III) derived from a monomer (c) copolymerizable with the monomer (a) and/or the monomer (b), provided that a total of the structural unit (I), the structural unit (II), and the structural unit (III) is 100 wt %:

$$Y^1O(R^1O)_nR^2 \quad (1)$$

in the general formula (1), $Y^1$ represents $CH_2$=$CR^0$—$(CH_2)_m$—, $R^0$ represents a hydrogen atom or an alkyl group having 1 to 3 carbon atoms, m represents an integer of from 0 to 2, $R^1O$ represents one or two or more kinds of oxyalkylene groups each having 2 to 18 carbon atoms, n represents an average number of moles added of oxyalkylene groups, and is more than 0 and 500 or less, and $R^2$ represents a hydrogen atom or a hydrocarbon group having 1 to 30 carbon atoms;

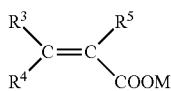
(2)

in the general formula (2), $R^3$, $R^4$, and $R^5$ may be identical to or different from one another, and each represent a hydrogen atom or a methyl group, and M represents a hydrogen atom, a metal atom, an ammonium group, or an organic ammonium group.

Advantageous Effects of Invention

According to the present invention, the method in which when, in the production of a specific copolymer containing the structural unit derived from the unsaturated polyalkylene glycol ether-based monomer and the structural unit derived from the unsaturated monocarboxylic acid-based monomer as essential components, water for polymerization use containing a small amount of impurities is prepared and used by the pure water production step and the pure water transfer step, the copolymer can be stably produced can be provided.

DESCRIPTION OF EMBODIMENTS

In this description, the expression "(meth)acrylic" means "acrylic and/or methacrylic", the expression "(meth)acrylate" means "acrylate and/or methacrylate", the expression "(meth)allyl" means "allyl and/or methallyl", and the expression "(meth)acrolein" means "acrolein and/or methacrolein". In addition, in this description, the expression "acid (salt)" means "an acid and/or a salt thereof". In addition, in this description, the expression "mass" may be replaced with the expression "weight" that has heretofore been generally in common use as the unit of a weight. Conversely, in this description, the expression "weight" may be replaced with the expression "mass" that has been in common use as an SI unit representing a weight.

In this description, at the time of the calculation of, for example, the content of a structural unit or the content of a monomer, when an unsaturated carboxylic acid-based monomer (b) adopts the form of a salt (i.e., a carboxylate), the calculation is performed on the assumption that the monomer does not adopt the form of a salt. In the case of, for example, sodium acrylate, its content is calculated as that of acrylic acid.

A method of producing a copolymer of the present invention is a method of producing a specific copolymer (to be described in detail later), and includes a pure water production step, a pure water transfer step, and a polymerization step.

The method of producing a copolymer of the present invention may include any appropriate other step to the extent that the effects of the present invention are not impaired as long as the method includes the pure water production step, the pure water transfer step, and the polymerization step. For example, the method of producing a copolymer of the present invention may include a pure water storage step between the pure water production step and the pure water transfer step. In addition, pure water as a purchase produced through the pure water production step may be subjected to the pure water transfer step (or the pure water storage step).

In the pure water production step, pure water having an electric conductivity of from 0.1 μS/cm to 100 μS/cm is produced. The term "pure water" as used herein refers to water obtained by subjecting industrial water or tap water to a treatment, such as a deionization treatment, a distillation treatment, or a reverse osmosis membrane treatment, to reduce the amount of impurities therein. In addition, in this description, the electric conductivity is a value measured at a water temperature of 25° C.

Any appropriate step may be adopted as the pure water production step as long as the pure water having an electric conductivity of from 0.1 μS/cm to 100 μS/cm can be produced in the step. For example, pure water production steps introduced into various production plants may each be adopted.

The electric conductivity of the pure water to be produced in the pure water production step is from 0.1 μS/cm to 100 μS/cm, preferably from 0.1 μS/cm to 80 μS/cm, more preferably from 0.1 μS/cm to 60 μS/cm, still more preferably from 0.1 μS/cm to 40 μS/cm, particularly preferably from 0.1 μS/cm to 20 μS/cm.

In the pure water transfer step, the pure water produced in the pure water production step is transferred to a reaction kettle in which the polymerization step is performed.

In the pure water transfer step, the transfer is performed with a transfer pipe. That is, the pure water produced in the pure water production step moves in the transfer pipe.

A material for the transfer pipe is a resin or a substance forming a passive state in water, and is preferably at least one kind selected from a resin containing at least one kind selected from the group consisting of polyethylene, polypropylene, polystyrene, polyvinyl chloride, polyester, and Teflon (trademark), and an alloy containing at least one kind selected from the group consisting of chromium, aluminum, and titanium. The material for the transfer pipe is more preferably stainless steel (austenite-based stainless steel, austenite/ferrite-based stainless steel, ferrite-based stainless steel, or martensite-based stainless steel), and is still more preferably austenite-based stainless steel, such as SUS304 or SUS316. When, in the production of the specific copolymer (to be described in detail later), water for polymerization use containing a small amount of impurities is prepared by the pure water production step and used, and any such material is adopted as the material for the transfer pipe, the copolymer can be stably produced.

The term "passive state" refers to a stable oxide film to be produced on a metal surface, and the production of the passive state suppresses the corrosion of the transfer pipe and the elution of a metal component.

A possible reason why a specific material needs to be used as the material for the transfer pipe as described above is that trace impurities eluted from the transfer pipe also inhibit the production stability of the specific copolymer. One achievement of the present invention is as follows: the inventors have paid attention to the fact that the transfer pipe has a large influence on the inclusion of the trace impurities, and have succeeded in suppressing the influence.

Although the copolymer can be stably produced by using the transfer pipe made of the specific material, in order that the copolymer may be more stably produced, such conditions that the inclusion of impurities is avoided to the extent possible are preferably selected for the length, inner diameter, and outer diameter of the transfer pipe, the flow velocity of the pure water at the time of its transfer, and the like.

Any appropriate magnitude may be adopted as each of the length and inner diameter of the transfer pipe, and the flow velocity at the time of the transfer in accordance with, for example, the size of a production plant. The length of the transfer pipe is preferably from 1 m to 500 m, more preferably from 1 m to 300 m, still more preferably from 1 m to 200 m. The inner diameter of the transfer pipe is preferably from 10 mm to 100 mm, more preferably from 13 mm to 100 mm, still more preferably from 15 mm to 100 mm. The flow velocity at the time of the transfer is preferably from 0.1 m/sec to 10 m/sec, more preferably from 0.2 m/sec to 10 m/sec, still more preferably from 0.4 m/sec to 10 m/sec.

A pure water contact time parameter (CT) may be adopted as an indicator at the time of the selection of the conditions of the transfer pipe. The parameter is a parameter calculated from the surface area of the transfer pipe having a length of 1 m in contact with the pure water at the time of the passing of the pure water through the transfer pipe, and the time period for which the pure water is in contact with the transfer pipe at the time of the passing, and is calculated from the following calculation equation.

Pure water contact time parameter (CT)=T/S $$T=L/V$$

$$S=2\pi \times R$$

T: The time period for which the pure water is in contact with the transfer pipe per 1 m of the transfer pipe
S: The surface area of the transfer pipe in contact with the pure water per 1 m of the transfer pipe
L: The length of the transfer pipe (length along which the pure water is in contact with the transfer pipe)
V: The flow velocity of the pure water
R: The inner radius of the transfer pipe A known measurement method only needs to be used as a method of measuring the flow velocity V. Examples thereof include (i) a method involving arranging a flow velocity meter, such as a commercial electromagnetic flow velocity meter or propeller-type flow velocity meter, in the flow path of the pipe to measure the flow velocity, and (ii) a method involving measuring the flow rate of the water flowing in the pipe and then calculating its flow velocity from the following equation.

Flow velocity (m/sec)=flow rate ($m^3$/sec)/pipe sectional area ($m^2$)

In addition, a known measurement method only needs to be used as a method of measuring the flow rate. Examples thereof include (i) a method involving arranging a flow rate meter, such as a commercial electromagnetic flow rate meter or ultrasonic flow rate meter, in the flow path of the pipe to measure the flow rate, and (ii) a method involving actually measuring the volume of the water discharged from the pipe during a certain time period and calculating its flow rate per unit time.

The pure water contact time parameter (CT) is preferably from $1.0 \times 10^2$ sec/$m^2$ to $3.0 \times 10^5$ sec/$m^2$, more preferably from $1.2 \times 10^2$ sec/$m^2$ to $2.5 \times 10^5$ sec/$m^2$, still more preferably from $1.2 \times 10^2$ sec/$m^2$ to $1.5 \times 10^5$ sec/$m^2$. It is conceivable that when the pure water contact time parameter (CT) is set to $3.0 \times 10^5$ sec/$m^2$ or less, the inclusion of impurities from the transfer pipe can be suppressed, and hence the copolymer can be more stably polymerized. Meanwhile, according to the present invention in which the transfer pipe using, as a material therefor, the resin or the substance forming a passive state in water is used, the copolymer can be stably polymerized even when the pure water contact time parameter (CT) is $1.0 \times 10^2$ sec/$m^2$ or more. An increase in pure water contact time parameter (CT), if possible, is advantageous in that the degree of freedom in design of the pipe increases. The flow velocity V means an instantaneous flow velocity. In addition, it is preferred that the pure water contact time parameter (CT) in 70 vol % or more of the pure water to be transferred in the production method fall within the range, it is more preferred that the pure water contact time parameter (CT) in 90 vol % or more thereof fall within the range, it is still more preferred that the pure water contact time parameter (CT) in 95 vol % or more thereof fall within the range, and it is particularly preferred that the pure water contact time parameter (CT) in 100 vol % thereof fall within the range.

The polymerization step is a step of producing the specific copolymer (to be described in detail later) in the reaction kettle through polymerization. The transfer pipe to be used in the pure water transfer step is introduced into the reaction kettle to be used in the polymerization step. Such a material that the elution of a metal component or impurities from the reaction kettle is suppressed is preferably used as a material for the reaction kettle. Specifically, a reaction kettle produced by using stainless steel or a hastelloy, or a reaction kettle whose surface has been subjected to glass lining is used.

In the present invention, the electric conductivity of the pure water at a site where the pure water is introduced from the transfer pipe toward the reaction kettle is measured and set within the range of from 0.1 µS/cm to 100 µS/cm. When the electric conductivity of the pure water at the site where the pure water is introduced from the transfer pipe toward the reaction kettle is set within the range of from 0.1 µS/cm to 100 µS/cm, in the case where, in the production of the specific copolymer (to be described in detail later), water for polymerization use containing a small amount of impurities is prepared by the pure water production step and used, the copolymer can be stably produced. In the production of a polymer or a copolymer except the specific copolymer (to be described in detail later), even when the electric conductivity of the pure water at the site where the pure water is introduced from the transfer pipe toward the reaction kettle deviates from the range of from 0.1 µS/cm to 100 µS/cm, the polymer or the copolymer can be stably produced. However, in the production of the specific copolymer (to be described in detail later), unless the electric conductivity of the pure water at the site where the pure water is introduced from the transfer pipe toward the reaction kettle falls within the range of from 0.1 µS/cm to 100 µS/cm, the copolymer cannot be stably produced. That is, in order that the production of the specific copolymer to be described in detail later may be stably performed, the following conditions need to be satisfied: pure water having an electric conductivity of from 0.1 µS/cm to 100 µS/cm is produced in the pure water production step; the pure water is introduced into the reaction kettle through a transfer pipe using, as a material therefor, a resin or a substance forming a passive state in water in the pure water transfer step; and the electric conductivity of the pure water at a site where the pure water is introduced from the transfer pipe toward the reaction kettle is set within the range of from 0.1 µS/cm to 100 µS/cm. When any one of the conditions is not satisfied, the copolymer cannot be stably produced.

The electric conductivity of the pure water at the site where the pure water is introduced from the transfer pipe toward the reaction kettle is from 0.1 µS/cm to 100 µS/cm, preferably from 0.1 µS/cm to 80 µS/cm, more preferably from 0.1 µS/cm to 60 µS/cm, still more preferably from 0.1 µS/cm to 40 µS/cm, particularly preferably from 0.1 µS/cm to 20 µS/cm.

The polymerization step is a step of polymerizing a monomer composition containing a monomer (a), the monomer (b), and a monomer (c), and in the step, the specific copolymer is produced in the reaction kettle by the polymerization. The specific copolymer is a copolymer containing 50 wt % to 99 wt % of a structural unit (I) derived from the unsaturated polyalkylene glycol ether-based monomer (a) represented by the general formula (1), 1 wt % to 50 wt % of a structural unit (II) derived from the unsaturated monocarboxylic acid-based monomer (b) represented by the general formula (2), and 0 wt % to 49 wt % of a structural unit (III) derived from the monomer (c) copolymerizable with the monomer (a) and/or the monomer (b), provided that the total of the structural unit (I), the structural unit (II), and the structural unit (III) is 100 wt %.

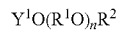
(1)

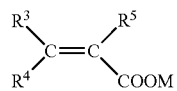
(2)

The number of kinds of the unsaturated polyalkylene glycol ether-based monomers (a) each represented by the general formula (1) may be only one, or may be two or more.

The number of kinds of the unsaturated monocarboxylic acid-based monomers (b) each represented by the general formula (2) may be only one, or may be two or more.

The number of kinds of the monomers (c) may be only one, or may be two or more.

A ratio "structural unit (I)/structural unit (II)/structural unit (III)" is 50 to 99/1 to 50/0 to 49 (wt %), the ratio "structural unit (I)/structural unit (II)/structural unit (III)" is preferably 55 to 98/2 to 45/0 to 40 (wt %), and the ratio "structural unit (I)/structural unit (II)/structural unit (III)" is more preferably 60 to 97/3 to 40/0 to 30 (wt %), provided that the total of the structural unit (I), the structural unit (II), and the structural unit (III) is 100 wt %.

A ratio between the structural unit (I) and the structural unit (II) is as follows: a molar ratio "structural unit (I)/structural unit (II)" is preferably less than 1, the molar ratio "structural unit (I)/structural unit (II)" is more preferably equal to or less than 0.95, the molar ratio "structural unit (I)/structural unit (II)" is still more preferably equal to or less than 0.90, the molar ratio "structural unit (I)/structural unit (II)" is particularly preferably equal to or less than 0.85, and the molar ratio "structural unit (I)/structural unit (II)" is most preferably equal to or less than 0.80.

In the general formula (1), $Y^1$ represents $CH_2=CR^0-(CH_2)_m-$, $R^0$ represents a hydrogen atom or an alkyl group having 1 to 3 carbon atoms, and m represents an integer of from 0 to 2. $R^0$ preferably represents a hydrogen atom or a methyl group.

Examples of the group $Y^1$ include a vinyl group ($CH_2=CH-$ group), a 1-methyl-1-vinyl group ($CH_2=C(CH_3)-$ group), a 2-propenyl group (allyl group) ($CH_2=CHCH_2-$ group), a 2-methyl-2-propenyl group (methallyl group) ($CH_2=C(CH_3)-CH_2-$ group), and a 3-methyl-3-butenyl group (isoprenyl group) ($CH_2=C(CH_3)-CH_2CH_2-$ group). Of those, a vinyl group, a 2-propenyl group (allyl group), a 2-methyl-2-propenyl group (methallyl group), and a 3-methyl-3-butenyl group (isoprenyl group) are preferred, a 2-methyl-2-propenyl group (methallyl group) and a 3-methyl-3-butenyl group (isoprenyl group) are more preferred, and a 3-methyl-3-butenyl group (isoprenyl group) is still more preferred.

In the general formula (1), $R^1O$ represents one or two or more kinds of oxyalkylene groups each having 2 to 18 carbon atoms. The number of carbon atoms of the oxyalkylene groups is preferably from 2 to 8, more preferably from 2 to 4.

Examples of the group $R^1O$ include an oxyethylene group, an oxypropylene group, an oxybutylene group, and an oxystyrene group. Of those, an oxyethylene group, an oxypropylene group, and an oxybutylene group are preferred, and an oxyethylene group and an oxypropylene group are more preferred. When two or more different $R^1O$ structures are present, the different $R^1O$ structures may be present in the form of any one of, for example, a random adduct, a block adduct, and an alternate adduct. An oxyethylene group is preferably incorporated as an essential component into the oxyalkylene groups for securing balance between hydrophilicity and hydrophobicity. More specifically, the ratio of the oxyethylene groups with respect to 100 mol % of all the oxyalkylene groups is as follows: the oxyethylene groups preferably account for 50 mol % or more of all the oxyalkylene groups, the oxyethylene groups more preferably account for 80 mol % or more thereof, the oxyethylene groups particularly preferably account for 90 mol % or more thereof, and the oxyethylene groups most preferably account for 100 mol % thereof.

In the general formula (1), n represents the average number of moles added of the oxyalkylene groups, and is more than 0 and 500 or less. n is preferably from 2 to 250, more preferably from 3 to 200, still more preferably from 4 to 150, particularly preferably from 5 to 75. The term "average number of moles added" means the average number of moles of added oxyalkylene groups in 1 mol of the compound.

In the general formula (1), $R^2$ represents a hydrogen atom or a hydrocarbon group having 1 to 30 carbon atoms.

Examples of the hydrocarbon group having 1 to 30 carbon atoms include an alkyl group having 1 to 30 carbon atoms, a substituted or unsubstituted aryl group having 6 to 30 carbon atoms, and a substituted or unsubstituted aralkyl group having 7 to 30 carbon atoms.

The alkyl group having 1 to 30 carbon atoms may be any one of linear, branched, and cyclic alkyl groups, and examples thereof include linear, branched, and cyclic alkyl groups, such as a methyl group, an ethyl group, a n-propyl group, a n-butyl group, a n-pentyl group (amyl group), a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosanyl group, an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group, a 2-ethylbutyl group, a 2-ethyl-2-methylpropyl group, a 1-methylheptyl group, a 2-ethylhexyl group, a 1,5-dimethylhexyl group, a t-octyl group, a branched nonyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group (C7), an adamantyl group (C10), and a cyclopentylethyl group. The alkyl group having 1 to 30 carbon atoms is preferably a methyl group, an ethyl group, a n-propyl group, an isopropyl group, a n-butyl group, or an isobutyl group, and is more preferably a methyl group, an ethyl group, a n-propyl group, or a n-butyl group. In addition, the alkyl group having 1 to 30 carbon atoms is preferably an alkyl group having 1 to 10 carbon atoms, more preferably an alkyl group having 1 to 8 carbon atoms.

Examples of the aryl group having 6 to 30 carbon atoms include a phenyl group, an alkyl phenyl group, a phenyl group substituted with an alkyl phenyl group, and a naphthyl group. In addition, the aryl group having 6 to 30 carbon atoms is preferably an aryl group having 6 to 10 carbon atoms.

Examples of the aralkyl group having 7 to 30 carbon atoms include a benzyl group, a 1-phenylethyl group, a 2-phenylethyl group, a 3-phenylpropyl group, a 4-phenylbutyl group, a styryl group (Ph-CH=C— group), a cinnamyl group (Ph-CH=CHCH$_2$— group), a 1-benzocyclobutenyl group, and a 1,2,3,4-tetrahydronaphthyl group.

When, in the general formula (1), $R^2$ represents the substituted aryl group having 6 to 30 carbon atoms or the substituted aralkyl group having 7 to 30 carbon atoms, a substituent is exemplified by an alkyl group having 1 to 3 carbon atoms and an aryl group having 6 to 10 carbon atoms.

Specific examples of the unsaturated polyalkylene glycol ether-based monomer (a) represented by the general formula (1) include polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl) ether, polyethylene polypropylene glycol mono(3-methyl-3-butenyl) ether, methoxypolyethylene glycol mono(3-methyl-3-butenyl) ether, ethoxypolyethylene glycol mono(3-methyl-3-butenyl) ether, 1-propoxypolyethylene glycol mono(3-methyl-3-butenyl) ether, cyclohexyloxypolyethylene glycol mono(3-methyl-3-butenyl) ether, 1-octyloxypolyethylene glycol mono(3-methyl-3-butenyl) ether, nonylalkoxypolyethylene glycol mono(3-methyl-3-butenyl) ether, laurylalkoxypolyethylene glycol mono(3-methyl-3-butenyl) ether, stearylalkoxypolyethylene glycol mono(3-methyl-3-butenyl) ether, phenoxypolyethylene glycol mono(3-methyl-3-butenyl) ether, naphthoxypolyethylene glycol mono(3-methyl-3-butenyl) ether, polyethylene glycol mono(2-methyl-2-propenyl) ether, polyethylene glycol monovinyl ether, vinyloxypropyl polyethylene glycol or vinyloxybutyl polyethylene glycol in which an oxypropylene group or an oxybutylene group is bonded to vinyl oxygen, and polyethylene glycol mono(2-propenyl) ether.

The unsaturated polyalkylene glycol ether-based monomer (a) represented by the general formula (1) is preferably an alkylene oxide adduct of allyl alcohol, 3-methyl-3-buten-1-ol, 2-methyl-2-propen-1-ol (methallyl alcohol), or vinyl alcohol, and is more preferably polyethylene glycol mono(3-methyl-3-butenyl) ether or polyethylene glycol mono(2-methyl-2-propenyl) ether.

In the general formula (2), $R^3$, $R^4$, and $R^5$ may be identical to or different from one another, and each represent a hydrogen atom or a methyl group.

In the general formula (2), M represents a hydrogen atom, a metal atom, an ammonium group, or an organic ammonium group.

The unsaturated monocarboxylic acid-based monomer (b) represented by the general formula (2) is preferably a (meth)acrylic acid-based monomer. Specific examples thereof may include acrylic acid, methacrylic acid, and crotonic acid, and monovalent metal salts, divalent metal salts, ammonium salts, organic ammonium salts, and organic amine salts thereof. In terms of copolymerizability, the unsaturated monocarboxylic acid-based monomer (b) represented by the general formula (2) is preferably (meth)acrylic acid and/or a salt thereof, more preferably acrylic acid and/or a salt thereof.

A ratio between the unsaturated polyalkylene glycol ether-based monomer (a) and the unsaturated monocarboxylic acid-based monomer (b) preferably satisfies a relationship of {the monomer (b)/(the monomer (a)+the monomer (b))}×100≥5.8 in terms of a weight ratio.

Specific examples of the monomer (c) copolymerizable with the monomer (a) and/or the monomer (b) include: unsaturated dicarboxylic acid-based monomers, such as maleic acid, maleic anhydride, fumaric acid, itaconic acid, and citraconic acid, and monovalent metal salts, divalent metal salts, ammonium salts, organic ammonium salts, and organic amine salts thereof; half esters and diesters of the unsaturated dicarboxylic acid-based monomers and alcohols each having 1 to 30 carbon atoms; half amides and diamides of the unsaturated dicarboxylic acid-based monomers and amines each having 1 to 30 carbon atoms; half esters and diesters of alkyl (poly)alkylene glycols obtained by adding 1 mol to 500 mol of alkylene oxides each having 2 to 18 carbon atoms to the alcohols or the amines, and the unsaturated dicarboxylic acid-based monomers; half esters and diesters of the unsaturated dicarboxylic acid-based monomers and glycols each having 2 to 18 carbon atoms or polyalkylene glycols each having a number of moles added of the glycols of from 2 to 500; esters of unsaturated monocarboxylic acids and alcohols each having 1 to 30 carbon atoms, such as methyl (meth)acrylate, ethyl (meth) acrylate, propyl (meth)acrylate, glycidyl (meth)acrylate, methyl crotonate, ethyl crotonate, and propyl crotonate; esters of alkoxy (poly)alkylene glycols obtained by adding 1 mol to 500 mol of alkylene oxides each having 2 to 18 carbon atoms to alcohols each having 1 to 30 carbon atoms, and unsaturated monocarboxylic acids, such as (meth) acrylic acid; adducts obtained by adding 1 mol to 500 mol of alkylene oxides each having 2 to 18 carbon atoms to unsaturated monocarboxylic acids, such as (meth)acrylic acid, such as (poly)ethylene glycol monomethacrylate, (poly)propylene glycol monomethacrylate, and (poly)butylene glycol monomethacrylate; half amides of maleamic acid and glycols each having 2 to 18 carbon atoms or polyalkylene glycols having a number of moles added of the glycols of from 2 to 500; (poly)alkylene glycol di(meth) acrylates, such as triethylene glycol di(meth)acrylate, (poly) ethylene glycol di(meth)acrylate, polypropylene glycol di(meth)acrylate, and (poly)ethylene glycol (poly)propylene glycol di(meth)acrylate; bifunctional (meth)acrylates, such as hexanediol di(meth)acrylate, trimethylolpropane tri (meth)acrylate, and trimethylolpropane di(meth)acrylate; (poly)alkylene glycol dimaleates, such as triethylene glycol dimaleate and polyethylene glycol dimaleate; unsaturated sulfonic acids, such as vinyl sulfonate, (meth)allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyloxysulfobenzoate, 4-(meth)acryloxybutyl sulfonate, (meth)acrylamide methylsulfonic acid, (meth)acrylamide ethylsulfonic acid, (meth) acrylamide-2-methylpropanesulfonic acid, and styrenesulfonic acid, and monovalent metal salts, divalent metal salts, ammonium salts, organic ammonium salts, and organic amine salts thereof; amides of unsaturated monocarboxylic acids and amines each having 1 to 30 carbon atoms, such as methyl (meth)acrylamide; vinyl aromatic compounds, such as styrene, α-methylstyrene, vinyltoluene, and p-methylstyrene; alkanediol mono(meth)acrylates, such as 1,4-butanediol mono(meth)acrylate, 1,5-pentanediol mono(meth)acrylate, and 1,6-hexanediol mono(meth)acrylate; dienes, such as butadiene, isoprene, 2-methyl-1,3-butadiene, and 2-chloro-1,3-butadiene; unsaturated amides, such as (meth) acrylamide, (meth)acrylic (alkyl)amide, N-methylol (meth) acrylamide, and N,N-dimethyl (meth)acrylamide; unsaturated cyanogen compounds, such as (meth)acrylonitrile and α-chloroacrylonitrile; unsaturated esters, such as vinyl acetate and vinyl propionate; unsaturated amines, such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic compounds, such as divinylbenzene; cyanurates, such as triallyl cyanurate; allyl compounds, such as (meth)allyl alcohol and glycidyl (meth) allyl ether; unsaturated amino compounds, such as dimethylaminoethyl (meth)acrylate; and siloxane derivatives, such as polydimethylsiloxane propylaminomaleamic acid, polydimethylsiloxane aminopropyleneaminomaleamic acid, polydimethylsiloxane-bis-(propylaminomaleamic acid), polydimethylsiloxane-bis-(dipropyleneaminomaleamic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate). Of those, an unsaturated dicarboxylic acid-based monomer, such as maleic acid, maleic anhydride, fumaric acid, itaconic acid, citraconic acid, and/or a salt thereof, is preferred as the monomer (c), and an α,β-unsaturated dicarboxylic acid-based monomer, such as maleic acid, maleic anhydride, fumaric acid, citraconic acid, and/or a salt thereof, is more preferred.

The weight-average molecular weight of the copolymer is preferably from 10,000 to 300,000, more preferably from 10,000 to 100,000, still more preferably from 10,000 to 80,000, particularly preferably from 10,000 to 70,000 in terms of polyethylene glycol by gel permeation chromatography.

The coefficient of variation CV of the weight-average molecular weight of the copolymer is preferably 0.04 or less, more preferably 0.03 or less. The coefficient of variation CV is described in detail later. The coefficient of variation CV is an indicator of variation, and a smaller value therefor means that polymerization reproducibility is higher. In an actual plant, the foregoing specification only needs to be applied to the coefficient of variation CV of weight-average molecular weights between batches, and is preferably applied to the coefficient of variation CV of weight-average molecular weights among three consecutive batches. In one embodiment, when the production of the copolymer is performed under the same conditions at least three times, the weight-average molecular weights of the copolymers to be obtained each fall within the range of from 10,000 to 300,000 (preferably from 10,000 to 100,000, more preferably from 10,000 to 80,000, still more preferably from 10,000 to 70,000) in terms of polyethylene glycol by gel permeation chromatography, and the coefficient of variation CV of the weight-average molecular weights of the copolymers to be obtained is 0.04 or less (preferably 0.03 or less).

In the polymerization step, the copolymer is produced in the reaction kettle by polymerization. Specifically, the copolymer is produced by polymerizing the monomers serving as raw materials for the copolymer in the reaction kettle. More specifically, for example, the copolymer is produced by copolymerizing monomer components containing the unsaturated polyalkylene glycol ether-based monomer (a) represented by the general formula (1) and the unsaturated monocarboxylic acid-based monomer (b) represented by the general formula (2) as essential components. The copolymer may also be obtained by, for example, a method involving: using a monomer before the addition of an alkylene oxide or a polyalkylene glycol, that is, an unsaturated alcohol, such as 3-methyl-3-buten-1-ol, 3-methyl-2-buten-1-ol, or 2-methyl-3-buten-2-ol, instead of the unsaturated polyalkylene glycol ether-based monomer (a) represented by the general formula (1); copolymerizing the monomer with the monomer (b) in the presence of a polymerization initiator (the other monomer (c) copolymerizable with the monomers may be further copolymerized as required); and then adding the alkylene oxide to, or causing an alkoxy polyalkylene glycol to react with, the resultant. The method may also be adopted in the polymerization step.

The copolymerization may be performed by any appropriate method, such as solution polymerization involving using water as an essential solvent. The solution polymerization may be performed by a batch system or a continuous system. Examples of a solvent that may be used in the solution polymerization include: water; alcohols, such as methyl alcohol, ethyl alcohol, and isopropyl alcohol; ester compounds, such as ethyl acetate; ketone compounds, such as acetone and methyl ethyl ketone; and cyclic ether compounds, such as tetrahydrofuran and dioxane. The solvent that may be used in the solution polymerization is preferably water.

When the polymerization of the monomer components is performed, for example, water-soluble polymerization initiators, including: persulfates, such as ammonium persulfate, sodium persulfate, and potassium persulfate; hydrogen peroxide; and water-soluble azo-based initiators, for example, azoamidine compounds, such as 2,2'-azobis-2-methylpropionamidine hydrochloride, cyclic azoamidine compounds, such as 2,2'-azobis-2-(2-imidazolin-2-yl)propane hydrochloride, and azonitrile compounds, such as 2-carbamoylazoisobutyronitrile, may each be used as the polymerization initiator. Those polymerization initiators may each be used in combination with an accelerator, such as an alkali metal sulfite, such as sodium hydrogen sulfite, a metabisulfite, sodium hypophosphite, an Fe(II) salt, such as Mohr's salt, sodium hydroxymethanesulfinate dihydrate, hydroxylamine hydrochloride, thiourea, L-ascorbic acid (salt), or erythorbic acid (salt). Of those combined use forms, a combination of hydrogen peroxide or ammonium persulfate and an accelerator, such as L-ascorbic acid (salt), is preferred. Those polymerization initiators or accelerators may be used alone or in combination thereof.

When the solution polymerization is performed by using a solvent containing a lower alcohol, an ester compound, or a ketone compound, for example, peroxides, such as benzoyl peroxide, lauroyl peroxide, and sodium peroxide, hydroperoxides, such as t-butyl hydroperoxide and cumene hydroperoxide, and azo compounds, such as azobisisobutyronitrile, may each be used as the polymerization initiator. When any such polymerization initiator is used, an accelerator, such as an amine compound, may be used in combination therewith. Further, when a mixed solvent containing water and a lower alcohol is used, a polymerization initiator appropriately selected from the various polymerization initiators, or a combination appropriately selected from the combinations of the polymerization initiators and the accelerators may be used.

A reaction temperature at the time of the polymerization of the monomer components is appropriately determined by a polymerization method, a solvent, a polymerization initiator, and a chain transfer agent to be used. Such reaction temperature is preferably 0° C. or more, more preferably 30° C. or more, still more preferably 50° C. or more, and is preferably 100° C. or less, more preferably 90° C. or less, still more preferably 80° C. or less.

Any appropriate method may be adopted as a method of loading the monomer components into a reaction vessel (reaction kettle). Examples of such loading method include: a method involving collectively loading the total amount of the components into the reaction vessel (reaction kettle) at an initial stage; a method involving loading the total amount into the reaction vessel (reaction kettle) in a divided or continuous manner; and a method involving loading part of the components into the reaction vessel (reaction kettle) at the initial stage and loading the remainder thereof into the reaction vessel (reaction kettle) in a divided or continuous manner. In addition, the loading weight ratio of each monomer per unit time may be changed in a continuous or stepwise manner by changing the rate at which each monomer is loaded into the reaction vessel (reaction kettle) in a continuous or stepwise manner in the midst of the reaction. The polymerization initiator may be loaded into the reaction vessel (reaction kettle) from the beginning, or may be dropped into the reaction vessel (reaction kettle), or these methods may be combined in accordance with purposes. Water to be loaded into the reaction vessel (reaction kettle) at the initial stage, water to be used at the time of the loading of the monomer components, and water to be used at the time of the loading of additives, such as the polymerization initiator, the accelerator, and the chain transfer agent (to be described later), are also each preferably the pure water obtained in the pure water production step. That is, all kinds of water to be used in the polymerization step are each preferably the pure water obtained in the pure water production step.

A chain transfer agent may be preferably used at the time of the polymerization of the monomer components. The use of the chain transfer agent facilitates the adjustment of the molecular weight of the copolymer to be obtained. The chain transfer agents may be used alone or in combination thereof.

Any appropriate chain transfer agent may be adopted as the chain transfer agent. Examples of such chain transfer agent include: thiol-based chain transfer agents, such as mercaptoethanol, thioglycerol, thioglycolic acid, 2-mercaptopropionic acid, 3-mercaptopropionic acid, thiomalic acid, and 2-mercaptoethanesulfonic acid; secondary alcohols, such as isopropanol; and lower oxides of phosphorous acid, hypophosphorous acid, and salts thereof (e.g., sodium hypophosphite and potassium hypophosphite), and sulfurous acid, hydrogen sulfite, dithionous acid, metabisulfurous acid, and salts thereof (e.g., sodium sulfite, potassium sulfite, sodium hydrogen sulfite, potassium hydrogen sulfite, sodium dithionite, potassium dithionite, sodium metabisulfite, and potassium metabisulfite), and salts thereof.

From the viewpoint of the handleability of the produced copolymer, the pH of a reaction solution after the production of the copolymer is preferably adjusted to 5 or more. In this case, in order that a rate of polymerization may be improved, it is preferred that the polymerization be performed at a pH of less than 5 and the pH be adjusted to 5 or more after the polymerization. The adjustment of the pH may be performed with, for example, an alkaline substance, such as: an inorganic salt, such as a hydroxide or carbonate of a monovalent metal or a divalent metal; ammonia; or an organic amine.

The concentration of the solution obtained by the production of the copolymer may be adjusted as required.

The produced copolymer may be used as it is in the form of the solution, or may be used after having been powdered by the following: the copolymer is neutralized with a hydroxide of a divalent metal, such as calcium or magnesium, to be turned into a polyvalent metal salt, and is then dried; or the copolymer is carried on inorganic powder, such as silica-based fine powder, and dried.

With regard to a method of loading the respective monomers into the reaction kettle at the time of the copolymerization, the time point at which the cumulative loading ratio of the unsaturated polyalkylene glycol ether-based monomer (a) into the reaction kettle (wt % of the monomer (a) that has already been loaded with respect to the total loading amount of the monomer (a)) is larger than the cumulative loading ratio of the unsaturated monocarboxylic acid-based monomer (b) into the reaction kettle (wt % of the monomer (b) that has already been loaded with respect to the total loading amount of the monomer (b)) is preferably present in the polymerization step. Specific examples of the loading method include the following methods:

(i) a method involving collectively loading the total amount of the monomer (a) into the reaction kettle before the initiation of the polymerization, and loading the total amount of the monomer (b) into the reaction kettle in a divided or continuous manner after the initiation of the loading of the polymerization initiator into the reaction kettle;

(ii) a method involving loading the total amount of the monomer (a) and part of the monomer (b) into the reaction kettle before the initiation of the polymerization, and loading the remainder of the monomer (b) into the reaction kettle in a divided or continuous manner after the initiation of the loading of the polymerization initiator into the reaction kettle;

(iii) a method involving loading part of the monomer (a) into the reaction kettle before the initiation of the polymerization, and loading the remainder of the monomer (a) and the total amount of the monomer (b) into the reaction kettle in a divided or continuous manner after the initiation of the loading of the polymerization initiator into the reaction kettle;

(iv) a method involving loading part of the monomer (a) and part of the monomer (b) into the reaction kettle before the initiation of the polymerization, and loading the remainder of the monomer (a) and the remainder of the monomer (b) into the reaction kettle in a divided or continuous manner after the initiation of the loading of the polymerization initiator into the reaction kettle, in which the time point at which the loading of the monomer (b) into the reaction kettle is completed falls behind the time point at which the loading of the monomer (a) into the reaction kettle is completed;

(v) a method involving loading part of the monomer (a) and part of the monomer (b) into the reaction kettle before the initiation of the polymerization, and loading the remainder of the monomer (a) and the remainder of the monomer (b) into the reaction kettle in a divided or continuous manner after the initiation of the loading of the polymerization initiator into the reaction kettle, in which the time point at which the cumulative loading ratio of the monomer (a) into the reaction kettle (wt % of the monomer (a) that has already been loaded with respect to the total loading amount of the monomer (a)) is larger than the cumulative loading ratio of the monomer (b) into the reaction kettle (wt % of the monomer (b) that has already been loaded with respect to the total loading amount of the monomer (b)) is present; and (vi) a method involving loading the total amount of the monomer (a) and the total amount of the monomer (b) into the reaction kettle in a divided or continuous manner after the initiation of the loading of the polymerization initiator into the reaction kettle, in which the time point at which the cumulative loading ratio of the monomer (a) into the reaction kettle (wt % of the monomer (a) that has already been loaded with respect to the total loading amount of the monomer (a)) is larger than the cumulative loading ratio of the monomer (b) into the reaction kettle (wt % of the monomer (b) that has already been loaded with respect to the total loading amount of the monomer (b)) is present.

According to any one of the methods listed in the (i) to the (vi), the monomer (a) and the monomer (b) can be efficiently copolymerized despite the fact that the polymerizability of the monomer (a) is lower than the polymerizability of the monomer (b). A method of loading the monomer (c) into the reaction kettle is not particularly limited, and any one of the following methods may be adopted: a method involving collectively loading the total amount of the monomer into the reaction kettle at the initial stage; a method involving loading the total amount of the monomer into the reaction kettle in a divided or continuous manner; and a method involving loading part of the monomer into the reaction kettle at the initial stage and loading the remainder thereof into the reaction kettle in a divided or continuous manner.

Further, the neutralization ratio of each of the monomer (b) and the monomer (c) is not particularly limited, and the neutralization ratio only needs to be changed so as not to affect the polymerization initiator, the chain transfer agent, and the like. The polymerization reaction is performed under such conditions, and after the completion of the reaction, the neutralization and concentration adjustment of the copolymer are performed as required.

A ratio among the respective monomers to be used at the time of the production of the copolymer is not particularly limited as long as the monomer (a) and the monomer (b) are used as essential components, and a ratio "monomer (a)/monomer (b)/monomer (c)" is preferably 50 to 99/1 to 50/0 to 49 (wt %), the ratio "monomer (a)/monomer (b)/monomer (c)" is more preferably 55 to 98/2 to 45/0 to 40 (wt %), and the ratio "monomer (a)/monomer (b)/monomer (c)" is still more preferably 60 to 97/3 to 40/0 to 30 (wt %), provided that the total of the monomer (a), the monomer (b), and the monomer (c) is 100 wt %.

EXAMPLES

The present invention is described in more detail below by way of Examples, but the present invention is not limited to these Examples. "Part(s)" means "part(s) by weight" and "%" means "wt %" unless otherwise specified. In addition, the term "weight" as used herein is identical in meaning to the term "mass" meaning a weight. Therefore, the term "weight" may be replaced with the term "mass," or the term "mass" may be replaced with the term "weight."

<GPC Measurement Conditions>

Measurement was performed under the following conditions.

Used column: manufactured by Tosoh Corporation, TSK Guard Column SWXL+TSKgel G4000SWXL+G3000SWXL+G2000SWXL Eluent: A solution obtained by dissolving 115.6 g of sodium acetate trihydrate into a mixed solvent of 10,999 g of water and 6,001 g of acetonitrile, and further adjusting the pH to 6.0 with acetic acid was used.

Sample loading amount: 100 μL

Flow velocity: 1.0 mL/min

Column temperature: 40° C.

Detector: manufactured by Waters, refractive index detector 2414

Analysis software: manufactured by Waters, Empower Software+GPC option

Standard substance for drawing calibration curve: polyethylene glycol [peak top molecular weight (Mp): 272,500, 219,300, 107,000, 50,000, 24,000, 12,600, 7,100, 4,250, and 1,470]

Calibration curve: drawn in a cubic expression on the basis of the Mp values and elution times of the polyethylene glycols Sample: A solution obtained by dissolving an aqueous solution of a polymer in the eluent so that the concentration of the polymer became 0.5 wt % was defined as a sample.

<Analysis of Molecular Weight>

A polymer was detected and analyzed by connecting stably flat portions in baselines immediately before the elution of the polymer and immediately after the elution in the resultant RI chromatogram to each other with a straight line, provided that when a polymer peak was observed under a state in which the peaks of a monomer, impurities derived from the monomer, and the like partially overlapped the peak, a polymer portion and a monomer portion were separated from each other by vertically dividing the polymer peak in the most recessed portion of a portion in which the peaks of the monomer and the impurities, and the peak of the polymer overlapped each other, followed by the measurement of the molecular weight and molecular weight distribution of only the polymer portion. When the polymer portion and the other portion completely overlapped each other, and hence could not be separated from each other, the molecular weight and molecular weight distribution of a set of the portions were calculated.

<Electric Conductivity>

The electric conductivity of sample water whose temperature had been controlled in a thermostat at 25° C. was measured with a pH meter "D-54" manufactured by HORIBA, Ltd. mounted with a conductivity cell "3551-10D" manufactured by HORIBA, Ltd.

<Evaluation of Polymerization Reproducibility>

Polymerization was performed under the same conditions three times, and the coefficient of variation CV of the weight-average molecular weights of the resultant copolymers was determined from the following equation.

$$m = \frac{1}{N}\sum_{i=1}^{N} x_i$$

$$\sigma^2 = \frac{1}{N}\sum_{i=1}^{N} (x_i - m)^2$$

$$cv = \sigma/m$$

N: Number of trials

X: Weight-average molecular weight

The evaluation of polymerization reproducibility was performed on the basis of the resultant coefficient of variation CV by the following criteria. The coefficient of variation CV is an indicator of variation, and a smaller value therefor means that the polymerization reproducibility is higher. A value for the coefficient of variation CV is preferably 0.04 or less, more preferably 0.03 or less. In an actual plant, the foregoing specification only needs to be applied to the coefficient of variation CV of weight-average molecular weights between batches, and is preferably applied to the coefficient of variation CV of weight-average molecular weights among three consecutive batches. In Table 1, a case in which the coefficient of variation CV was 0.03 or less was evaluated as the best (⊚), and a case in which the coefficient of variation CV was more than 0.03 and 0.04 or less was evaluated as satisfactory (○). In addition, a case in which the coefficient of variation CV was more than 0.04 and 0.05 or less was evaluated as Δ, a case in which the coefficient of variation CV was more than 0.05 and 0.06 or less was evaluated as ×, and a case in which the coefficient of variation CV was more than 0.06 was evaluated as ××.

Example 1

(Pure Water Production Step)

Tap water having an electric conductivity of 154.8 μS/cm was passed through one pretreatment cartridge filter (RF000141, manufactured by ADVANTEC), two ion exchange resin cartridges (RF000131, manufactured by ADVANTEC), and one hollow yarn filter (RF000220, manufactured by ADVANTEC) at a flow rate of 1 L/min through the use of a distilled water-producing apparatus (RFD342NA, manufactured by ADVANTEC) to produce pure water (1) having an electric conductivity of 0.67 μS/cm.

(Pure Water Storage Step)

10 Kilograms of the pure water (1) produced in the pure water production step was stored in a container made of polypropylene.

(Pure Water Transfer Step)

The pure water (1) stored in the pure water storage step was circulated in a transfer pipe made of SUS304 (having an inner diameter of 10.5 mm and a length of 10 m) with a pump A (manufactured by Tsurumi Manufacturing Co., Ltd., FP-5S) at a flow velocity of 1.0 m/s for 1 hour. The electric conductivity of the pure water (1) discharged from the transfer pipe after the circulation was 0.80 μS/cm. A pure water contact time parameter (CT) under the transfer conditions was $1.1 \times 10^5$ sec/m².

A method of calculating the pure water contact time parameter (CT) is as described below. The pure water was circulated in the transfer pipe at a flow velocity of 1.0 m/s for 1 hour, and hence the length of the transfer pipe (length along which the pure water is in contact with the transfer pipe) is calculated to be L=1.0 (m/s)×3,600 (sec)=3,600 (m). Accordingly, the T, the S, and the CT are calculated as described below.

$T=L/V=3,600/1=3,600$ (sec)

$S=2\pi \times R=2\times 3.14\times (0.0105/2)=0.03297$ (m²)

$CT=T/S=3,600/0.03297=1.1\times 10^5$ (sec/m²)

(Polymerization Step)

96.4 Grams of the pure water (1) discharged in the pure water transfer step and 225.0 g of an unsaturated alcohol obtained by adding 50 mol of ethylene oxide to 3-methyl-3-buten-1-ol were loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and a temperature in the reaction vessel was increased to 58° C. under a nitrogen atmosphere. After that, 11.9 g of a 2% aqueous solution of hydrogen peroxide was collectively added to the reaction vessel. An aqueous solution obtained by dissolving 18.1 g of acrylic acid in 4.0 g of the pure water (1) was dropped into the reaction vessel over 4 hours. Simultaneously with the initiation of the dropping of the aqueous solution of acrylic acid, an aqueous solution obtained by dissolving 1.2 g of 3-mercaptopropionic acid and 0.5 g of L-ascorbic acid in 41.1 g of the pure water (1) was dropped into the reaction vessel over 4.5 hours. After that, the temperature was maintained at 58° C. continuously for 60 minutes to complete a polymerization reaction. The temperature was reduced to 50° C. or less, and the resultant was neutralized with a 30% aqueous solution of sodium hydroxide so that its pH changed from 4 to 7. Thus, a copolymer (1) was obtained.

The results are shown in Table 1.

Example 2

A copolymer (2) was obtained in the same manner as in Example 1 except that the transfer pipe made of SUS304 to be used in the pure water transfer step was changed to a transfer pipe made of SUS316 (having an inner diameter of 10.5 mm and a length of 10 m), and hence the electric conductivity of pure water (2) discharged from the transfer pipe after its circulation became 0.83 μS/cm.

Example 3

A copolymer (3) was obtained in the same manner as in Example 1 except that the transfer pipe made of SUS304 to be used in the pure water transfer step was changed to a transfer pipe made of polyvinyl chloride (having an inner diameter of 10.0 mm and a length of 10 m), and hence the electric conductivity of pure water (3) discharged from the transfer pipe after its circulation became 0.75 µS/cm.

Example 4

(Pure Water Production step)

Pure water (4) having an electric conductivity of 18.50 µS/cm was produced by mixing the pure water (1) having an electric conductivity of 0.67 µS/cm, which had been produced in the pure water production step of Example 1, and tap water having an electric conductivity of 154.8 µS/cm at a weight ratio "pure water (1)/tap water" of 9/1.

(Pure Water Storage Step)

10 Kilograms of the pure water (4) produced in the pure water production step was stored in a container made of polypropylene.

(Pure Water Transfer Step)

The pure water (4) stored in the pure water storage step was circulated in a transfer pipe made of SUS304 (having an inner diameter of 10.5 mm and a length of 10 m) with the pump A at a flow velocity of 1.0 m/s for 1 hour. The electric conductivity of the pure water (4) discharged from the transfer pipe after the circulation was 18.58 µS/cm.

(Polymerization Step)

A copolymer (4) was obtained by performing the same polymerization as that of Example 1 except that the pure water to be used in the polymerization was changed to the pure water (4) discharged from the transfer pipe. The results are shown in Table 1.

Example 5

(Pure Water Production step)

Pure water (5) having an electric conductivity of 34.39 µS/cm was produced by mixing the pure water (1) having an electric conductivity of 0.67 µS/cm, which had been produced in the pure water production step of Example 1, and tap water having an electric conductivity of 154.8 µS/cm at a weight ratio "pure water (1)/tap water" of 8/2.

(Pure Water Storage Step)

10 Kilograms of the pure water (5) produced in the pure water production step was stored in a container made of polypropylene.

(Pure Water Transfer Step)

The pure water (5) stored in the pure water storage step was circulated in a transfer pipe made of SUS304 (having an inner diameter of 10.5 mm and a length of 10 m) with the pump A at a flow velocity of 1.0 m/s for 1 hour. The electric conductivity of the pure water (5) discharged from the transfer pipe after the circulation was 35.82 µS/cm.

(Polymerization Step)

A copolymer (5) was obtained by performing the same polymerization as that of Example 1 except that the pure water to be used in the polymerization was changed to the pure water (5) discharged from the transfer pipe. The results are shown in Table 1.

Example 6

In the pure water transfer step of Example 1, the time period for which the pure water was circulated in the pipe made of SUS304 was extended to 2 hours. The electric conductivity of pure water (1-b) discharged from the transfer pipe after the circulation was 0.82 µS/cm. A pure water contact time parameter (CT) under the transfer conditions was $2.2 \times 10^5$ sec/m$^2$.

A method of calculating the pure water contact time parameter (CT) is as described below. The pure water was circulated in the transfer pipe at a flow velocity of 1.0 m/s for 2 hours, and hence the length of the transfer pipe (length along which the pure water is in contact with the transfer pipe) is calculated to be L=1.0 (m/s)×7,200 (sec)=7,200 (m). Accordingly, the T, the S, and the CT are calculated as described below.

$$T = L/V = 7,200/1 = 7,200 \text{ (sec)}$$

$$S = 2\pi \times R = 2 \times 3.14 \times (0.0105/2) = 0.03297 \text{ (m}^2\text{)}$$

$$CT = T/S = 7,200/0.03297 = 2.2 \times 10^5 \text{ (sec/m}^2\text{)}$$

A copolymer (6) was obtained by performing the same polymerization as that of Example 1 except that the pure water to be used in the polymerization was changed to the pure water (1-b) discharged from the transfer pipe. The results are shown in Table 1.

Example 7

96.4 Grams of the pure water (1) transferred with the transfer pipe made of SUS304 in the pure water transfer step of Example 1 and 225.0 g of an unsaturated alcohol obtained by adding 50 mol of ethylene oxide to 3-methyl-3-buten-1-ol were loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and a temperature in the reaction vessel was increased to 58° C. under a nitrogen atmosphere. Subsequently, an aqueous solution obtained by dissolving 18.1 g of acrylic acid in 4.0 g of the pure water (1), an aqueous solution obtained by dissolving 5.0 g of ammonium persulfate in 15.0 g of the pure water (1), and an aqueous solution obtained by dissolving 1.3 g of 3-mercaptopropionic acid and 0.5 g of L-ascorbic acid in 30.0 g of the pure water (1) were simultaneously dropped into the reaction vessel at constant rates over 4 hours, 4.5 hours, and 4.5 hours, respectively. After that, the temperature was maintained at 58° C. continuously for 60 minutes to complete a polymerization reaction. The temperature was reduced to 50° C. or less, and the resultant was neutralized with a 30% aqueous solution of sodium hydroxide so that its pH changed from 4 to 7. Thus, a copolymer (7) was obtained. The results are shown in Table 1.

Example 8

96.4 Grams of the pure water (1) transferred with the transfer pipe made of SUS304 in the pure water transfer step of Example 1 and 225.0 g of an unsaturated alcohol obtained by adding 50 mol of ethylene oxide to 3-methyl-3-buten-1-ol were loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and a temperature in the reaction vessel was increased to 58° C. under a nitrogen atmosphere. Subsequently, an aqueous solution obtained by dissolving 18.1 g of acrylic acid in 4.0 g of the pure water (1), an aqueous solution obtained by dissolving 1.75 g of a 2% aqueous solution of hydrogen peroxide in 18.3 g of the pure water (1), and an aqueous solution obtained by dissolving 0.85 g of 3-mercaptopropionic acid and 0.09 g of L-ascorbic acid in 30.0 g of the pure water (1) were simultaneously dropped into the reaction vessel at constant rates over 4 hours, 4.5 hours, and 4.5 hours, respectively. After that, the temperature was maintained at 58° C. continuously for 60 minutes to complete a polymerization reaction. The temperature was reduced to 50° C. or less, and the resultant was neutralized with a 30% aqueous solution of sodium hydroxide so that its pH changed from 4 to 7. Thus, a copolymer (8) was obtained. The results are shown in Table 1.

Example 9

Pure water having an electric conductivity of 0.40 µS/cm, which had been obtained by distilling tap water, was transferred through a transfer pipe made of SUS304 (having an inner diameter of 28 mm and a length of 75 m) with a pump B (manufactured by Ebara Corporation, MODEL 40×25IFWM) at a flow velocity of 3 m/s in 25 seconds. The electric conductivity of pure water (6) collected from the pipe was 0.40 µS/cm. In addition, a pure water contact time parameter (CT) under the transfer conditions was $2.8 \times 10^2$ sec/m$^2$.

A method of calculating the pure water contact time parameter (CT) is as described below. The pure water was transferred through the transfer pipe at a flow velocity of 3.0 m/s in 25 seconds, and hence the length of the transfer pipe (length along which the pure water is in contact with the transfer pipe) is calculated to be L=3.0 (m/s)×25 (sec)=75 (m). Accordingly, the T, the S, and the CT are calculated as described below.

$$T=L/V=75/3=25 \text{ (sec)}$$

$$S=2\pi \times R=2 \times 3.14 \times (0.028/2)=0.08792 \text{ (m}^2\text{)}$$

$$CT=T/S=25/0.08792=2.8 \times 10^2 \text{ (sec/m}^2\text{)}$$

A copolymer (9) was obtained by performing the same polymerization as that of Example 1 except that the pure water to be used in the polymerization was changed to the pure water (6) described above. The results are shown in Table 1.

Example 10

122.8 Grams of the pure water (1) obtained through the pure water production step, the pure water storage step, and the pure water transfer step described in Example 1, and 205.3 g of an unsaturated alcohol obtained by adding 50 mol of ethylene oxide to methallyl alcohol were loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and a temperature in the reaction vessel was increased to 65° C. under a nitrogen atmosphere. After that, 20.0 g of a 2% aqueous solution of hydrogen peroxide was collectively added to the reaction vessel. An aqueous solution obtained by dissolving 33.4 g of acrylic acid in 8.0 g of the pure water (1) was dropped into the reaction vessel over 3 hours. Simultaneously with the initiation of the dropping of the aqueous solution of acrylic acid, an aqueous solution obtained by dissolving 0.9 g of 3-mercaptopropionic acid and 0.5 g of L-ascorbic acid in 25.3 g of the pure water (1) was dropped into the reaction vessel over 3.5 hours. After that, the temperature was maintained at 65° C. continuously for 60 minutes to complete a polymerization reaction. The temperature was reduced to 50° C. or less, and the resultant was neutralized with a 30% aqueous solution of sodium hydroxide so that its pH became 7. Thus, a copolymer (10) was obtained. The results are shown in Table 1.

Example 11

170.0 Grams of the pure water (1) obtained through the pure water production step, the pure water storage step, and the pure water transfer step described in Example 1, and 91.5 g of an unsaturated alcohol (total number of moles added of ethylene oxide: 25 mol) obtained by adding 23 mol of ethylene oxide to diethylene glycol monovinyl ether were loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and a temperature in the reaction vessel was increased to 40° C. under a nitrogen atmosphere. Subsequently, 35.0 g of a 2% aqueous solution of hydrogen peroxide, an aqueous solution obtained by dissolving 22.7 g of acrylic acid in 10.0 g of the pure water (1), and an aqueous solution obtained by dissolving 0.8 g of 3-mercaptopropionic acid and 0.9 g of L-ascorbic acid in 70.0 g of the pure water (1) were simultaneously dropped into the reaction vessel at constant rates over 1 hour and 45 minutes, 1 hour and 30 minutes, and 1 hour and 45 minutes, respectively. After that, the temperature was maintained at 40° C. continuously for 60 minutes to complete a polymerization reaction. After that, the resultant was neutralized with a 30% aqueous solution of sodium hydroxide so that its pH became 7. Thus, a copolymer (11) was obtained. The results are shown in Table 1.

TABLE 1

| | Copolymer | Electric conductivity of pure water produced in pure water production step (µS/cm) | Material for transfer pipe | Circulation time in transfer pipe (hour(s)) | Electric conductivity of pure water discharged from transfer pipe (µS/cm) | Weight-average molecular weight <Three times> | Polymerization reproduceibility CV | Evaluation |
|---|---|---|---|---|---|---|---|---|
| Example 1 | (1) | 0.67 | SUS304 | 1 | 0.80 | 21,200 21,400 21,700 | 0.010 | ☺ |
| Example 2 | (2) | 0.67 | SUS316 | 1 | 0.83 | 21,500 21,900 21,300 | 0.012 | ☺ |

TABLE 1-continued

|  | Copolymer | Electric conductivity of pure water produced in pure water production step (µS/cm) | Material for transfer pipe | Circulation time in transfer pipe (hour(s)) | Electric conductivity of pure water discharged from transfer pipe (µS/cm) | Weight-average molecular weight <Three times> | Polymerization reproduceibility CV | Evaluation |
|---|---|---|---|---|---|---|---|---|
| Example 3 | (3) | 0.67 | Polyvinyl chloride | 1 | 0.75 | 21,500 21,300 21,000 | 0.010 | ⊚ |
| Example 4 | (4) | 18.50 | SUS304 | 1 | 18.58 | 21,600 21,300 22,100 | 0.015 | ⊚ |
| Example 5 | (5) | 34.39 | SUS304 | 1 | 35.82 | 21,700 23,500 22,000 | 0.035 | ○ |
| Example 6 | (6) | 0.67 | SUS304 | 2 | 0.82 | 21,500 20,800 20,900 | 0.015 | ⊚ |
| Example 7 | (7) | 0.67 | SUS304 | 1 | 0.80 | 21,400 21,800 22,100 | 0.013 | ⊚ |
| Example 8 | (8) | 0.67 | SUS304 | 1 | 0.80 | 29,500 30,100 29,100 | 0.014 | ⊚ |
| Example 9 | (9) | 0.40 | SUS304 | — | 0.40 | 21,700 21,700 20,900 | 0.018 | ⊚ |
| Example 10 | (10) | 0.67 | SUS304 | 1 | 0.80 | 31,200 30,800 31,500 | 0.009 | ⊚ |
| Example 11 | (11) | 0.67 | SUS304 | 1 | 0.80 | 30,500 31,200 29,800 | 0.019 | ⊚ |

Comparative Example 1

A copolymer (C1) was obtained in the same manner as in Example 1 except that the pure water (1) to be used in the polymerization step in Example 1 was changed to tap water (having an electric conductivity of 154.8 µS/cm).

The results are shown in Table 2.

Comparative Example 2

A copolymer (C2) was obtained in the same manner as in Example 1 except that the transfer pipe made of SUS304 to be used in the pure water transfer step in Example 1 was changed to a transfer pipe made of carbon steel (having an inner diameter of 10.5 mm and a length of 10 m), and hence the electric conductivity of the pure water (1) discharged from the transfer pipe after its circulation became 0.97 µS/cm.

The results are shown in Table 2.

Comparative Example 3

In the pure water transfer step of Comparative Example 2, the time period for which the pure water was circulated in the pipe made of carbon steel was extended to 2 hours. The electric conductivity of pure water (1-c) discharged from the transfer pipe after the circulation was 1.25 µS/cm. A copolymer (C3) was obtained by performing the same polymerization as that of Example 1 except that the pure water to be used in the polymerization was changed to the pure water (1-c) discharged from the transfer pipe. The results are shown in Table 2.

Comparative Example 4

A copolymer (C4) was obtained in the same manner as in Example 10 except that in Example 10, tap water was used instead of the pure water (1) to be used in the polymerization step. The results are shown in Table 2.

Comparative Example 5

A copolymer (C5) was obtained in the same manner as in Example 10 except that in Example 10, pure water obtained by using a transfer pipe made of carbon steel was used instead of the pure water (1) to be used in the polymerization step. The results are shown in Table 2.

Reference Example 1

(Pure Water Production Step)

Tap water having an electric conductivity of 154.8 µS/cm was passed through one pretreatment cartridge filter (RF000141, manufactured by ADVANTEC), two ion exchange resin cartridges (RF000131, manufactured by ADVANTEC), and one hollow yarn filter (RF000220, manufactured by ADVANTEC) at a flow rate of 1 L/min through the use of a distilled water-producing apparatus (RFD342NA, manufactured by ADVANTEC) to produce pure water (1) having an electric conductivity of 0.67 µS/cm.

(Pure Water Storage Step)

10 Kilograms of the pure water (1) produced in the pure water production step was stored in a container made of polypropylene.

(Pure Water Transfer Step)

The pure water (1) stored in the pure water storage step was circulated in a transfer pipe made of SUS304 (having an inner diameter of 10.5 mm and a length of 10 m) with the pump A at a flow velocity of 1.0 m/s for 1 hour. The electric conductivity of the pure water (1) discharged from the transfer pipe after the circulation was 0.80 μS/cm.
(Polymerization Step)

150.0 Grams of the pure water (1) discharged in the pure water transfer step was loaded into a reaction vessel (reaction kettle) made of glass including a temperature gauge, a stirring machine, a dropping funnel, a nitrogen-introducing tube, and a reflux condenser. The reaction vessel (reaction kettle) was purged with nitrogen under stirring, and the inside of the reaction vessel was heated to 80° C. under a nitrogen atmosphere. Next, 108.8 g of methoxypolyethylene glycol monomethacrylate (average number of moles added of ethylene oxide: 45 mol), 10.6 g of methacrylic acid, and 65.5 g of the pure water (1) discharged in the pure water transfer step were mixed. The mixture was uniformly mixed with 0.3 g of a 30% aqueous solution of sodium hydroxide and 0.6 g of mercaptopropionic acid serving as a chain transfer agent. Thus, an aqueous solution of a monomer mixture was prepared. The aqueous solution of the monomer mixture was dropped into the reaction vessel over 4 hours, and an aqueous solution obtained by dissolving 0.8 g of ammonium persulfate in 49.2 g of the pure water (1) discharged in the pure water transfer step was dropped into the reaction vessel over 5 hours. After that, the temperature was maintained at 80° C. continuously for 1 hour to complete a solution polymerization reaction. Then, the resultant was neutralized with a 30% aqueous solution of sodium hydroxide so that its pH changed from 4 to 7. Thus, a copolymer (R1) was obtained.

The results are shown in Table 2.

Reference Example 2

A copolymer (R2) was obtained in the same manner as in Reference Example 1 except that the pure water (1) to be used in the polymerization step in Reference Example 1 was changed to tap water (having an electric conductivity of 154.8 μS/cm).

The results are shown in Table 2.

Reference Example 3

A copolymer (R3) was obtained in the same manner as in Reference Example 1 except that the transfer pipe made of SUS304 to be used in the pure water transfer step in Reference Example 1 was changed to a transfer pipe made of carbon steel (having an inner diameter of 10.5 mm and a length of 10 m), and hence the electric conductivity of the pure water (1) discharged from the transfer pipe after its circulation became 0.97 μS/cm.

The results are shown in Table 2.

TABLE 2

| | Copolymer | Electric conductivity of pure water produced in pure water production step (μS/cm) | Material for transfer pipe | Circulation time in transfer pipe (hour(s)) | Electric conductivity of pure water discharged from transfer pipe (μS/cm) | Weight-average molecular weight <Three times> | Polymerization reproduceibility | |
|---|---|---|---|---|---|---|---|---|
| | | | | | | | CV | Evaluation |
| Comparative Example 1 | (C1) | — | — | — | 154.8 (Tap water) | 24,100 23,000 25,800 | 0.047 | Δ |
| Comparative Example 2 | (C2) | 0.67 | Carbon steel | 1 | 0.97 | 23,200 24,800 22,000 | 0.051 | X |
| Comparative Example 3 | (C3) | 0.67 | Carbon steel | 2 | 1.25 | 25,100 23,700 21,400 | 0.065 | XX |
| Comparative Example 4 | (C4) | — | — | — | 154.8 (Tap water) | 34,500 36,900 32,300 | 0.054 | X |
| Comparative Example 5 | (C5) | 0.67 | Carbon steel | 1 | 0.97 | 34,700 32,500 30,900 | 0.048 | Δ |
| Reference Example 1 | (R1) | 0.67 | SUS304 | 1 | 0.80 | 26,600 26,100 26,700 | 0.010 | ⊚ |
| Reference Example 2 | (R2) | — | — | — | 154.8 (Tap water) | 28,200 28,500 28,900 | 0.010 | ⊚ |
| Reference Example 3 | (R3) | 0.67 | Carbon steel | 1 | 0.97 | 26,700 27,000 27,400 | 0.011 | ⊚ |

As shown in each of Examples 1 to 11, when water having an electric conductivity of from 0.1 μS/cm to 100 μS/cm was transferred through a pipe made of SUS serving as a material forming a passive state or a pipe made of vinyl chloride in the pure water production step, a result in which the polymerization reproducibility was excellent was obtained. In contrast, as shown in each of Comparative Examples 1 and 4, when water whose electric conductivity did not fall within the range of from 0.1 μS/cm to 100 μS/cm (tap water; electric conductivity: 154.8 μS/cm) was used in the pure water production step, a result in which the polymerization reproducibility was poor was obtained. In addition, as shown in each of Comparative Examples 2, 3, and 5, even when water having an electric conductivity of from 0.1 μS/cm to 100 μS/cm was produced in the pure water production step, and the electric conductivity of the water discharged from a transfer pipe was from 0.1 μS/cm to 100 μS/cm, in the case where the water was transferred through a pipe made of carbon steel that did not use, as a material therefor, a resin or a substance forming a passive state in water, a result in which the polymerization reproducibility was poor was obtained.

In addition, as is apparent from Examples 1 and 6, in the case where a pipe made of SUS serving as a material forming a passive state was used, even when the time period for which the transfer pipe and the pure water were in contact with each other became longer, a reduction in polymerization stability was small. Meanwhile, as is apparent from Comparative Examples 2 and 3, in the case where a pipe made of carbon steel was used, as the time period for which the transfer pipe and the pure water were in contact with each other became longer, the polymerization stability largely reduced.

In contrast, as shown in each of Reference Examples 1 to 3, it is found that at the time of the production of a polymer or a copolymer except the specific copolymer specified in the present invention, the electric conductivity in the pure water production step and the material for the transfer pipe do not affect the reproducibility of the copolymer.

That is, as shown in each of Examples and Comparative Examples of Tables 1 and 2, it is found that at the time of the production of the specific copolymer specified in the present invention, the copolymer cannot be stably produced unless pure water having an electric conductivity of from 0.1 μS/cm to 100 μS/cm is produced in the pure water production step, and is introduced into a reaction kettle through a transfer pipe made of a specific material in the pure water transfer step. In contrast, as shown in each of Reference Examples 1 to 3, it is found that at the time of the production of a polymer or a copolymer except the specific copolymer specified in the present invention, the reproducibility of the copolymer is not affected even when the electric conductivity of the pure water to be used in the polymerization is not strictly adjusted unlike the foregoing.

INDUSTRIAL APPLICABILITY

A copolymer obtained by the production method of the present invention can be utilized in, for example, a cement admixture.

What is claimed is:

1. A method of producing a copolymer containing 50 wt % to 99 wt % of a structural unit (I) derived from an unsaturated polyalkylene glycol ether-based monomer (a) represented by the general formula (1), 1 wt % to 50 wt % of a structural unit (II) derived from an unsaturated monocarboxylic acid-based monomer (b) represented by the general formula (2), and 0 wt % to 49 wt % of a structural unit (III) derived from a monomer (c) copolymerizable with the monomer (a) and/or the monomer (b), provided that a total of the structural unit (I), the structural unit (II), and the structural unit (III) is 100 wt %, the method comprising:
a pure water production step of producing pure water having an electric conductivity of from 0.1 μS/cm to 100 μS/cm;
a pure water transfer step of introducing the pure water into a reaction kettle for producing the copolymer through a transfer pipe using, as a material therefor, a resin or a substance forming a passive state in water; and
a polymerization step of performing polymerization of the monomer (a), the monomer (b), and the monomer (c) in the reaction kettle, the pure water transfer step comprising setting the electric conductivity of the pure water at a site where the pure water is introduced from the transfer pipe toward the reaction kettle within a range of from 0.1 μS/cm to 100 μS/cm:

in the general formula (1), $Y^1$ represents $CH_2=CR^0-(CH_2)_m-$, $R^0$ represents a hydrogen atom or an alkyl group having 1 to 3 carbon atoms, m represents an integer of from 0 to 2, $R^1O$ represents one or two or more kinds of oxyalkylene groups each having 2 to 18 carbon atoms, n represents an average number of moles added of oxyalkylene groups, and is more than 0 and 500 or less, and $R^2$ represents a hydrogen atom or a hydrocarbon group having 1 to 30 carbon atoms;

in the general formula (2), $R^3$, $R^4$, and $R^5$ may be identical to or different from one another, and each represent a hydrogen atom or a methyl group, and M represents a hydrogen atom, a metal atom, an ammonium group, or an organic ammonium group.

2. The production method according to claim 1, wherein the material for the transfer pipe comprises at least one kind selected from a resin containing at least one kind selected from the group consisting of polyethylene, polypropylene, polystyrene, polyvinyl chloride, polyester, and Teflon (trademark), and an alloy containing at least one kind selected from the group consisting of chromium, aluminum, and titanium.

3. The production method according to claim 1, wherein in the pure water transfer step, a length L (m) of the transfer pipe, a flow velocity V (m/sec) of the pure water, and an inner radius R (m) of the transfer pipe have a relationship of $1.0\times10^2$ sec/m²≤(L/V)/(2π×R)≤3 $0.0\times10^5$ sec/m².

4. The production method according to claim 1, wherein $R^0$ forming $Y^1$ in the general formula (1) represents a hydrogen atom or a methyl group.

5. The production method according to claim 1, wherein the unsaturated monocarboxylic acid-based monomer (b) comprises a (meth)acrylic acid-based monomer.

6. The production method according to claim 1, wherein a ratio between the unsaturated polyalkylene glycol ether-based monomer (a) and the unsaturated monocarboxylic acid-based monomer (b) satisfies a relationship of {the monomer (b)/(the monomer (a)+the monomer (b))}× 100≥5.8 in terms of a weight ratio.

7. The production method according to claim 1, wherein the copolymer has a weight-average molecular weight of from 10,000 to 300,000 in terms of polyethylene glycol by gel permeation chromatography.

8. The production method according to claim 1, wherein when production of the copolymer is performed under the same conditions at least three times, weight-average molecular weights of the copolymers to be obtained each fall within a range of from 10,000 to 300,000 in terms of polyethylene glycol by gel permeation chromatography, and a coefficient of variation CV of the weight-average molecular weights of the copolymers to be obtained is 0.04 or less.

* * * * *